No. 645,735. Patented Mar. 20, 1900.
G. A. LOWRY.
BALE HOLDING DEVICE.
(Application filed Nov. 11, 1899.)
(No Model.)
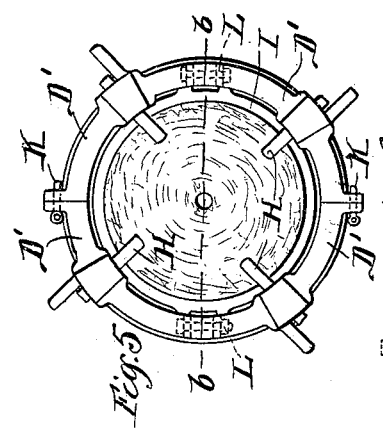
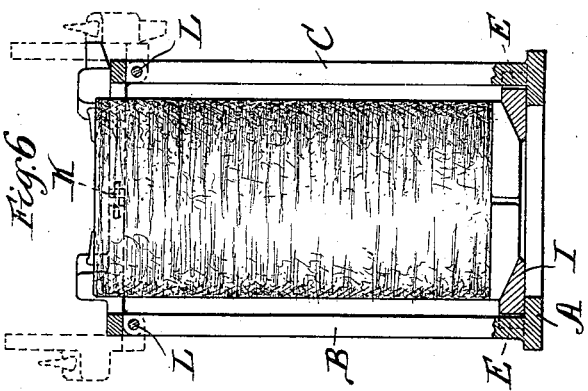
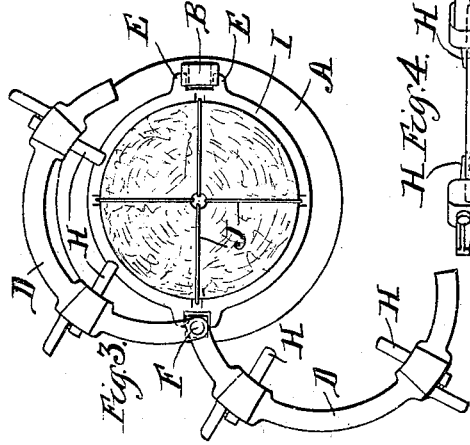
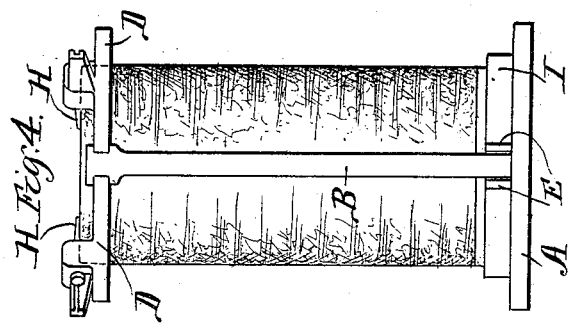
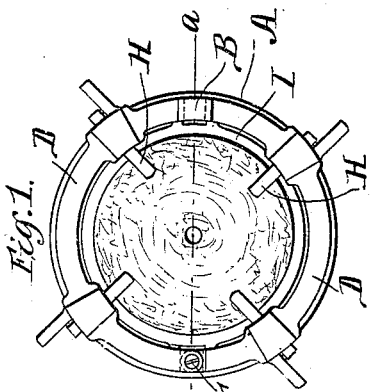
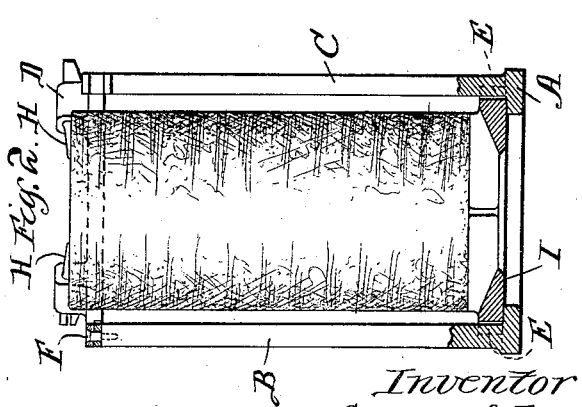
Witnesses.
Wm. M. Rheem
Eo. C. Semple
Inventor
George A. Lowry
by Bowen & Darby
Att'ys
THE NORRIS PETERS CO., PHOTO-LITHO., WASHINGTON, D. C.

UNITED STATES PATENT OFFICE.

GEORGE A. LOWRY, OF CHICAGO, ILLINOIS, ASSIGNOR TO THE PLANTERS COMPRESS COMPANY, OF WEST VIRGINIA.

BALE-HOLDING DEVICE.

SPECIFICATION forming part of Letters Patent No. 645,735, dated March 20, 1900.

Application filed November 11, 1899. Serial No. 736,579. (No model.)

*To all whom it may concern:*

Be it known that I, GEORGE A. LOWRY, a citizen of the United States, residing at Chicago, in the county of Cook and State of Illinois, have invented a new and useful Bale-Holding Device, of which the following is a specification.

This invention relates to bale-holding devices.

One object of the invention is to provide means of simple construction and arrangement for temporarily receiving and holding compressed bales or masses until the permanent stays are applied thereto.

A further object of the invention is to provide a bale-holder of a construction enabling the bale to be readily removed.

Other objects of the invention will appear more fully hereinafter.

The invention consists, substantially, in the construction, combination, location, and arrangement, all as will be more fully hereinafter set forth, as shown in the accompanying drawings, and finally pointed out in the appended claims.

Referring to the accompanying drawings and to the various views and reference-signs appearing thereon, Figure 1 is an end view or top plan of a bale holding and staying device embodying the principles of my invention applied to a bale. Fig. 2 is a longitudinal section of the same on the line *a a*, Fig. 1, the bale being shown in side elevation. Fig. 3 is a view similar to Fig. 1, showing the stay-ring open. Fig. 4 is a side elevation. Fig. 5 is a view similar to Figs. 1 and 3, showing a slightly-modified construction and arrangement. Fig. 6 is a longitudinal section on the line *b b*, Fig. 5, the open position of the holder-ring being indicated by dotted lines.

The same part is designated by the same reference-sign wherever it occurs.

In carrying out my invention I provide a frame or holder consisting of the end ring A, having standards or stays B C formed or otherwise suitably mounted thereon, thus forming an open framework or holder adapted to receive the bale of compressed material. Arranged in this frame or holder is a bale base or support I, adapted to receive the end of the bale or compressed mass and free to move endwise of the holder. If desired, the standards or stays B C may serve as guides for the bale base or support I, and to this end said base or support may be provided with lugs E, arranged to engage said standards or stays, as clearly shown. The end ring A of the holder-frame may serve as a stop to arrest the movement of the bale-base when the bale or the mass of compressed material has acquired the desired length. To the free ends of the frame standards or stays B C is applied a stay-ring. This stay-ring may be arranged in many different ways. In the form shown in Figs. 1, 2, 3, and 4 this ring is composed of the two segments D, suitably hinged together at adjacent ends upon one of the standards or stays, as at F, the other or free ends of said segments adapted to be locked together or to the other standard or stay, as indicated at G, Fig. 4. By unlocking the free ends of said segments said stay-ring may be opened, as shown in Fig. 3, thus permitting the bale or other mass of compressed material to be removed from the holder. The stay-ring is provided with suitable staying or engaging devices (indicated at H) adapted to engage the end of the bale or mass of material and hold the same clamped between such staying or holding devices and the bale base or support I, whereby said bale or mass of material is held against endwise expansion while or until the permanent stays or wires J (see Fig. 3) are applied.

In Figs. 1, 2, 3, and 4 I have shown the stay-ring composed of two sections D, hinged together at one end and adapted to be locked together at the other end. This ring may, if desired, be composed of more than two sections or segments.

In Fig. 5 I have shown the stay-ring composed of the four sections D', the adjacent ends of each pair of said sections being hinged and the other ends being suitably locked together, as at K.

In Figs. 1 and 3 the sections D of the ring are shown so pivoted or hinged as to move in the same plane and laterally with respect to the bale or mass of compressed material— that is, the hinge F is arranged longitudinally of the holder or staying device. It is obvious, however, that said segments may be mounted on transverse axes, as shown at L, Figs. 5 and 6.

From the foregoing description it will be seen that I provide a simple and efficient bale stay or holder which receives and stays the bale or other mass of compressed material and holds the same against expansion.

The invention forming the subject-matter of this application is related to the construction shown, described, and claimed, broadly, in my pending applications, Serial No. 725,279, filed July 27, 1899, and Serial No. 733,174, filed October 10, 1899, and an application filed of even date herewith.

Having now set forth the object and nature of my invention and a construction embodying the principles thereof and having explained such construction, its function, purpose, and mode of operation, what I claim as new and useful, and desire to secure by Letters Patent, is—

1. A bale-holding device composed of hinged or pivoted sections and having means for engaging the ends of the bale, as and for the purpose set forth.

2. A bale-holding device composed of sections hinged or pivoted together and having means for engaging the ends of the bale, as and for the purpose set forth.

3. In a bale-holding device, a stay-ring composed of sections or segments hinged together and adapted to engage one end of the bale, in combination with means for engaging the other end of the bale, as and for the purpose set forth.

4. In a bale-holding device, a stay-ring adapted to open and close to permit the removal of the bale, in combination with means coöperating therewith to clamp the bale endwise, as and for the purpose set forth.

5. In a bale-holding device, a stay-ring carrying devices arranged to engage the end of the bale, said ring made in movable sections to open and close, in combination with means coöperating with said ring to clamp the bale endwise therebetween, as and for the purpose set forth.

6. In a bale-holder, an end ring, stays connected thereto, and a sectional stay-ring connected to the other end of said stays, as and for the purpose set forth.

7. In a bale-holder, an end ring, standards or stays connected thereto, an independent movable bale-base for one end of the bale, and means arranged at the opposite end of said standards or stays to engage the opposite end of the bale, as and for the purpose set forth.

8. In a bale-holder, a frame comprising an end ring and standards or stays, and a stay-ring connected to the free ends of said standards or stays, said ring made in separable sections, as and for the purpose set forth.

9. In a bale-holder, a frame comprising an end ring and standards or stays, and a stay-ring connected to said standards or stays and adapted to clamp the bale between it and the end ring, said stay-ring made in pivoted sections, as and for the purpose set forth.

10. In a bale-holder, an end ring, standards or stays connected thereto, and a stay-ring composed of pivoted sections adapted to be locked together, as and for the purpose set forth.

11. In a bale-holder, an end ring, standards or stays connected thereto, a stay-ring connected to said standards or stays, and a bale-base movably mounted with respect to such rings, and arranged to be guided by said standards or stays, as and for the purpose set forth.

In witness whereof I have hereunto set my hand, this 7th day of November, 1899, in the presence of the subscribing witnesses.

GEORGE A. LOWRY.

Witnesses:
LOUISE CORNELL,
WM. M. RHEEM.